INVENTOR.
WALTER A. PLUMMER
BY
ATTORNEYS

United States Patent Office 3,350,752
Patented Nov. 7, 1967

3,350,752
LATERALLY-ENGAGING SELF-LOCKING
PLASTIC SEAM ASSEMBLY
Walter A. Plummer, 3546 Crownridge Drive,
Sherman Oaks, Calif. 91403
Filed Aug. 2, 1966, Ser. No. 569,705
11 Claims. (Cl. 24—201)

This invention relates to continuous seam-forming assemblies and more particularly to an improved high-strength self-locking assembly adapted to be extruded from thermoplastic materials and to interlock in a positive high-strength manner by relative lateral movement of the overlapped edges of the seam components.

A variety of proposals have been made heretofore respecting seam-forming components extruded or molded from thermoplastic materials and having components which interfit with one another under various assembly techniques to form a seam. Many of these involve tape-like structures of complex contours and configurations which are costly and difficult to make. Certain of these are dependent upon the use of tapes having portions of widely varying cross-sectional thicknesses with the result that portions of thinner cross-section are placed under excessive stress during use and this leads to premature failure. Still other designs are subject to opening prematurely.

By the present invention there is provided a self-locking seam assembly which avoids the foregoing and other defects of prior assemblies of this general type and which is characterized by its simplicity and the fact that both of the component tapes may be and preferably are of the same configuration. For this reason a given length of seam can be formed by a pair of tapes cut from the same length of the extruded product. More explicitly the present seam comprises a pair of reversely facing tape halves each having a V-shaped portion extending along one lateral edge and the end of the free leg of such V-shaped portion is beveled and serves as a pilot to guide the similarly shaped portion of the other seam component into nesting relation as tension is applied crosswise of the mounting webs of the tape. Thus, assembly and closure of the seam is accomplished by simply overlapping the V-shaped portions until the pilot portions of their free legs engage and then applying tension to the mounting webs to cam the legs into nesting relation.

The means holding the tapes in nested relation comprises cooperating shoulders formed lengthwise and inwardly from the end of the free leg as well as along the inner side of the second leg of the inter-locking portions. The major portion of the entire seam assembly is formed of material of substantially the same thickness, the major exception being the apex of each V-shaped portion which has a thickness along a bisector plane through the apex of approximately double the thickness of the material elsewhere in the assembly. This added thickness greatly resists spreading of the legs without which the engaged locking shoulders cannot become disengaged. Furthermore, loading tending to open the closed seam acts automatically to force the seam into tighter and deeper nesting relationship.

It is therefore a primary object of the present invention to provide an improved high-strength plastic seam assembly so constructed as to automatically cam itself into assembled relation as tension is applied to the remotely spaced lateral edges thereof.

Another object of the invention is the provision of a compact high-strength continuous seam assembly which tends to become more strongly locked in assembled position by the application of loading within design limits.

Another object of the invention is the provision of a self-locking and self-closing continuous seam assembly adapted to be closed without the need of a slider or special tool devices.

Another object of the invention is the provision of a self-locking continuous plastic seam assembly strongly resisting opening in an operating environment.

These and other more specific objects will appear upon reading the following specification and claims and upon considering in connection therewith the attached drawing to which they relate.

Referring now to the drawing in which a preferred embodiment of the invention is illustrated.

Figure 1:
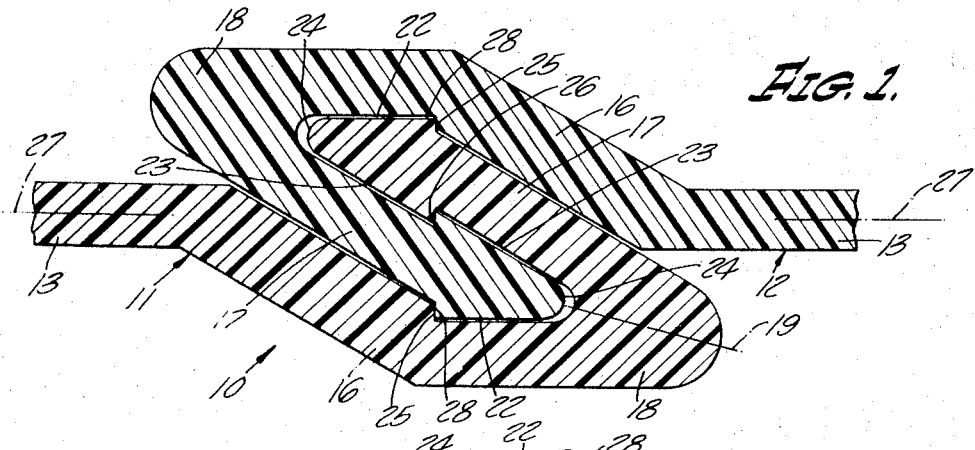
FIGURE 1 is a fragmentary view of a preferred embodiment of the invention seam assembly fully closed.
Figure 2:
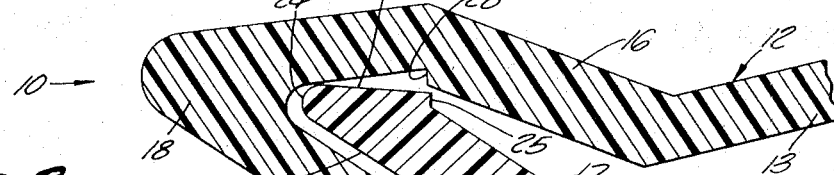
FIGURE 2 is a view similar to FIGURE 1 but showing the position of the parts during application of forces in an appropriate direction to open the seam.
Figure 3:
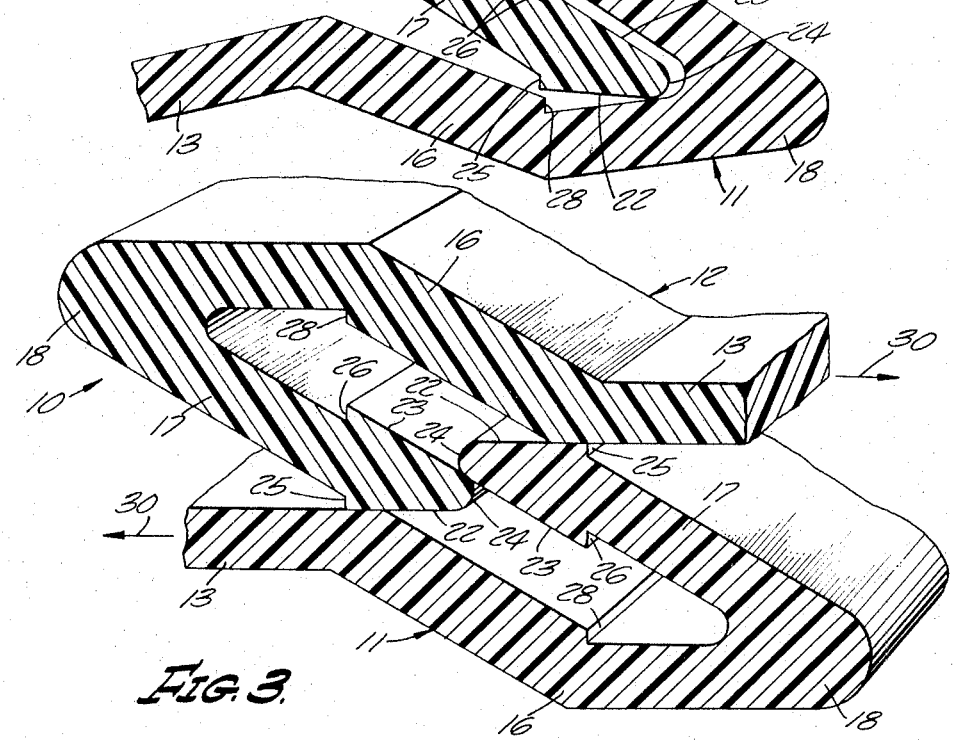
FIGURE 3 is a view similar to FIGURE 1 but showing the position of the overlapped seam parts during the initial stage of the closing operation.

Referring to FIGURES 1 to 3 there is shown one preferred embodiment of the invention seam assembly designated generally 10 and formed from two identical lengths of tape 11, 12. This tape is preferably extruded from suitable thermoplastic material by known technique, polyvinyl chloride, polyethylene, and the like thermoplastic materials being suitable for this purpose. In accordance with customary practice tapes 11 and 12 have mounting webs 13 the outer edges of which are shown broken away, these being well known in this art and have a suitable width for attaching the same to sheeting or any of numerous articles for which a seam is desirable. Customarily, the remote lateral edges of the mounting webs 13 are heat fused, bonded, riveted, sewed or otherwise attached to the material being equipped with a seam assembly.

The adjacent or inner edges of tapes 11 and 12, as here shown, each include identical but reversely facing V-shaped portions including a leg 16 having its outer end integral with mounting web 13 and a free leg 17. The apex junction 18 joining these legs has rounded interior and exterior surfaces and a relatively great thickness along a bisector plane 19 passing medially through the apex. Thus, it will be observed that this apex thickness is approximately double the leg thickness and serves the important function of strengthening the apex or hinge serving to connect the two legs 16 and 17. This factor taken with the fact that the tapes are preferably extruded from material having a relatively high bending coefficient or durometer results in the described seam assembly highly resisting opening and disengagement of its abutting shoulders.

The design of the end edge of free leg 17 is also significant. Thus the opposed surfaces 22, 23 converge toward and merge with the rounded leading edge 24. The widely spaced opposite ends of surfaces 22, 23 merge with respective shoulders 25, 26, here shown as lying in a common plane normal to a median plane 27 through mounting webs 13. A third locking shoulder 28 extends lengthwise along the inner surface of leg 16 and, as here shown, lies in a plane in common with shoulders 25 and 26 and normal to the median bisector plane 27.

To be noted is the fact that a major portion of each V-shaped portion is disposed to one side of median plane 27 with the V-portion on one tape being located on one side thereof and the other V-portion on the opposite side. Substantially the only portion of the V-legs not so disposed is the tip portion of free leg 17. As best appears from FIGURE 3, a sufficient portion of the tip end of leg 17 protrudes beyond the opposite side of its mounting web to enable the rounded leading edges 24 of the free legs to interengage with another during the initial stage of the closing operation as is best shown in FIGURE 3.

Surfaces 23 of the two legs then lie in a common plane inclined acutely to the mounting webs.

To assemble the described seam, the V-shaped portions of the two tapes are overlapped until the nose or leading edge portions 24 interengage with one another. Tension is then applied to the remotely spaced lateral edges of mounting webs 13 as is indicated by arrows 30 in FIGURE 3. This tension serves to cam the triangular portions of the two free legs into nesting relationship until each of the shoulders 25, 26, and 28 interengage with one another thereby positively locking the seam closed. During this closing operation the free legs are forcibly flexed away from legs 16 to the extent necessary to permit entry of the wider portions of the free legs. This flexing is strongly resisted by the thick apexes of the two V-shaped portions. Likewise, when the seam is closed this thick hinge is highly effective in resisting spreading of the legs and any tendency of the seam to open.

Should it be desirable to open the seam, mounting webs 13 are twisted out of their normal plane to that shown in FIGURE 2 as tension is applied in sufficient amount to flex the V-legs forcibly apart to disengage shoulders 25, 26 and 28. Thereupon the free legs are moved laterally crosswise of one another to disengage them.

While the particular laterally-engaging self-locking plastic seam assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A self-locking thermoplastic seam assembly comprising a pair of elongated tapes of subtsantially the same cross-sectional configuration having mounting webs extending along their remote edges and the adjacent edges being so shaped as to be interlockable by overlapping the same and then drawing said tapes laterally into nesting interlocked relation, the adjacent edges of said overlapped tapes each having oppositely facing deep V-shaped portions extending lengthwise thereof with the major portion thereof offset in opposite directions from a median plane through said mounting webs, said V-shaped portions including a free leg having a pair of locking shoulders projecting outwardly from the opposite sides of said free leg, the other leg of said V-shaped portions having a shoulder projecting inwardly from its inner surface, and all three shoulders being positioned to interlock with an adjacent shoulder of the other tape when said V-shaped portions are properly internested in the closed position of said seam assembly.

2. A self-locking seam assembly as defined in claim 1 characterized in that the surfaces of the shoulders engaged with one another in the closed position of said seam assembly lie generally normal to a median plane through said mounting webs.

3. A self-locking seam assembly as defined in claim 1 characterized in that the legs of said V-shaped portions and said mounting webs have thicknesses closely approximating one another, and the thickness of the apex zones of said V-shaped portions being substantially thicker along a plane bisecting said apex zones whereby said thick apex zones resist forces tending to open said seam assembly by spreading apart the legs of said V-shaped portions.

4. A self-locking seam assembly as defined in claim 1 characterized in that said shoulders all lie in substantially a common plane extending transversely of the closed seam assembly.

5. A self-locking seam assembly as defined in claim 1 characterized in that the tip end of the free leg of said V-shaped portions has surfaces converging to a narrow edge and which edge projects slightly beyond the surface of the mounting located on the remote side of said web from the major portion of said V-shaped portion whereby the tip ends of said free legs cooperate with one another in guiding said free legs into nesting relationship as said tapes are shifted laterally away from one another during a seam closing operation.

6. A self-locking seam assembly as defined in claim 1 characterized in that substantially equal proportions of said V-shaped portions protrude to either side of a median plane through said mounting webs in the closed condition of said seam assembly.

7. A self-locking seam assembly as defined in claim 6 characterized in that the major portions of the inner and outer surfaces of the legs of said V-shaped portions lie parallel to one another in the closed condition of said seam assembly and lie at an acute angle to a median plane through the mounting webs of said tapes whereby loading applied to said webs placing the latter under tension is effective to cam said V-shaped portions into deeper nesting relation with one another.

8. A self-locking continuous seam assembly comprising a pair of flexible tapes of extruded thermoplastic material having a mounting web extending along their remotely positioned lateral edges and complementally shaped oppositely facing V-shaped portions extending along their adjacent edges, said V-shaped portions including one leg integral with a mounting web and a free leg having its end formed with converging surfaces effective to pilot said free leg into nesting relation with the free leg of the other V-shaped portion, said one leg having a shoulder extending transversely thereof along its inner side and said free leg having a shoulder extending transversely of both the inner and outer sides thereof, and each of the shoulders of one V-shaped portion mutually cooperating with a juxtaposed shoulder of the other V-shaped portion to lock the mated V-shaped portions nested together.

9. A self-locking seam assembly as defined in claim 8 characterized in that said V-shaped portions are offset in opposite directions from a median plane through their respective mounting webs with the tips of their free legs projecting beyond the adjacent surfaces of their mounting webs to engage with one another when the tapes are overlapped excessively and then drawn apart in the planes of their mounting webs.

10. A self-locking seam assembly as defined in claim 9 characterized in that the walls of said mounting webs and of said legs are generally of the same thickness.

11. A self-locking seam assembly as defined in claim 9 characterized in that the junction between said one leg and said free leg has a thickness along a median bisector of said V-shaped portion which is approximately double said wall thickness whereby said legs strongly resist forces tending to spread said legs apart to open said seam assembly.

References Cited

UNITED STATES PATENTS 2,780,261   2/1957   Svec.

FOREIGN PATENTS 561,916   11/1957   Belgium.

BERNARD A. GELAK, *Primary Examiner.*